Oct. 5, 1965   I. E. R. ÅKERMAN   3,209,990
TWO STAGE SCREW ROTOR MACHINES
Filed Jan. 18, 1962   4 Sheets-Sheet 1

INVENTOR
IWAN ERNST ROLAND ÅKERMAN
BY
Ernst Maréchal Jr
ATTORNEY

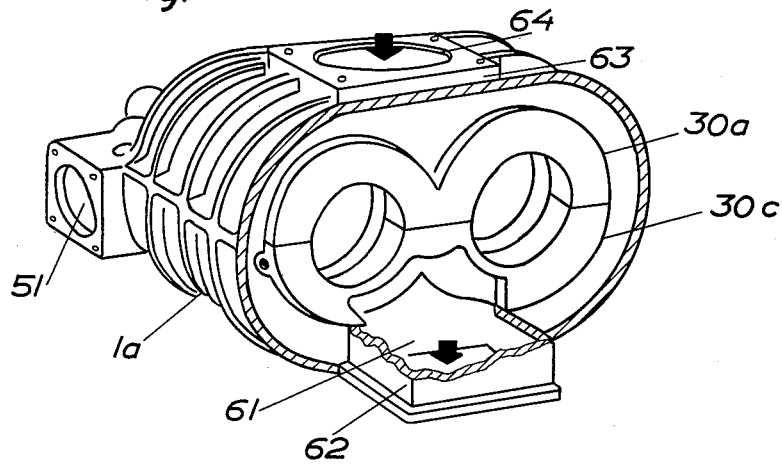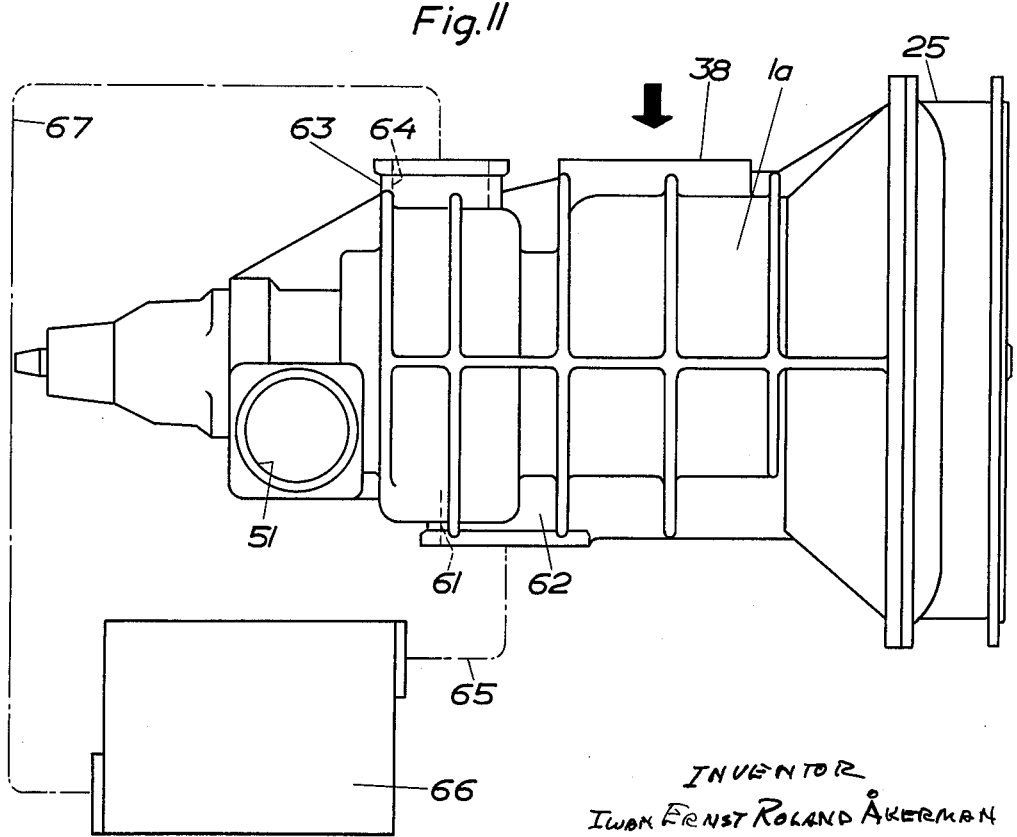

United States Patent Office 3,209,990
Patented Oct. 5, 1965

3,209,990
TWO STAGE SCREW ROTOR MACHINES
Iwan Ernst Roland Åkerman, Antwerp, Belgium, assignor to Atlas Copco Aktiebolag, Nacka, Sweden, a corporation of Sweden
Filed Jan. 18, 1962, Ser. No. 167,140
10 Claims. (Cl. 230—143)

This invention relates to two stage screw rotor machines comprising a casing structure having at least two intersecting parallel bores and a corresponding number of parallel two stage rotors provided each per se with two sets of intermeshing helical lobes and grooves and mounted to rotate in said bores. One object of the invention is to provide a screw rotor machine of this type in which leakage through various joints in the structure as well as between the rotors themselves and between the rotors and cooperating surfaces of the casing structure are kept at a minimum which is of capital importance for obtaining a high efficiency in machines of this type. Another object of the invention is to provide a machine of the type described in which machining of the parts forming the casing structure is simplified and reduced in order to reduce the manufacturing costs of the machine. A still further object is to provide a machine in which the low and high pressure rotors may both per se be made integral and in which adjustment of the high pressure rotor portion to the low pressure rotor portion of each rotor is avoided. A still further object of the invention is to provide a machine in which the casing structure is very rigid and capable of resisting high internal pressure without deformation to a degree which might influence the tightness of the machine. A still further object of the invention is to provide a design which lends itself to mass production methods.

Figure 1:
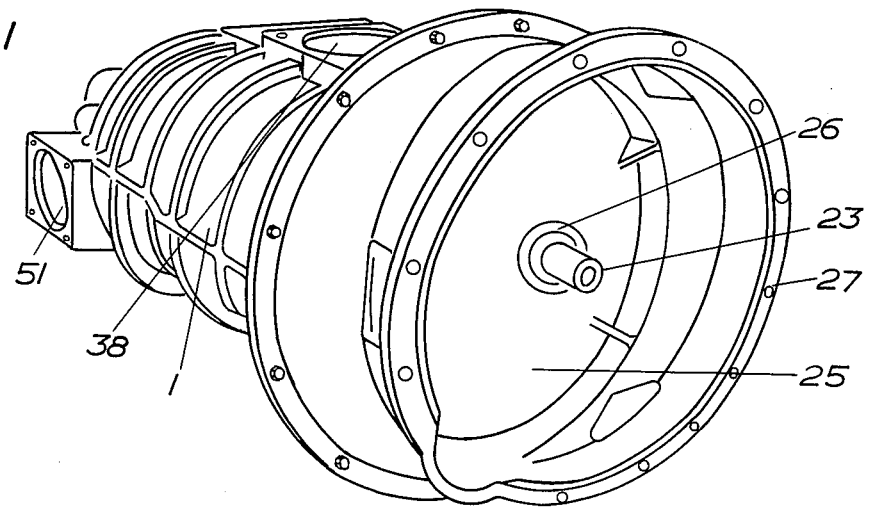
Figure 2:
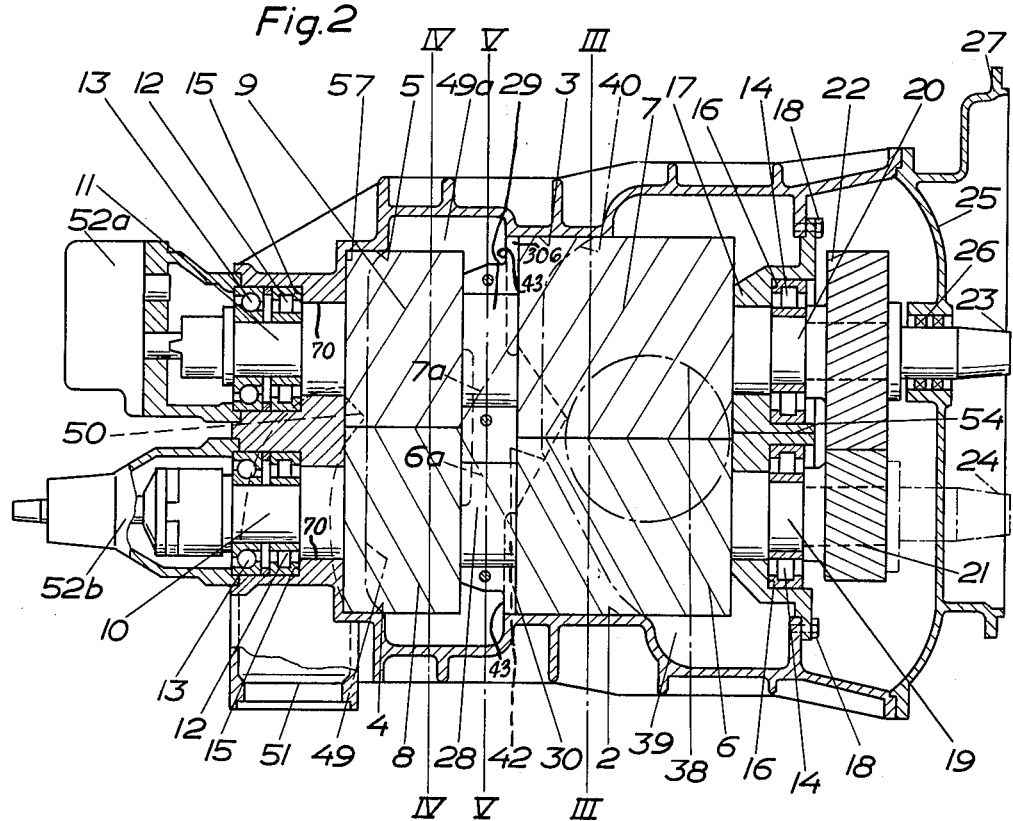
Figure 4:
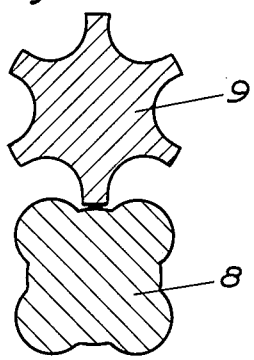
Figure 3:
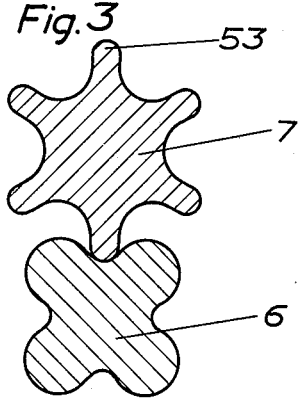
Figure 6:
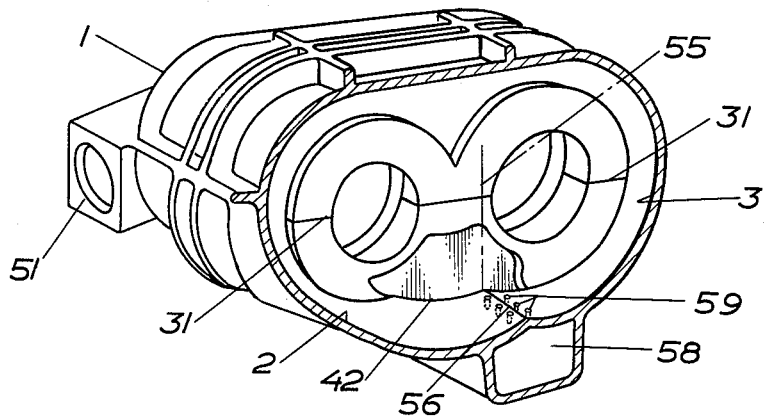
Figure 5:
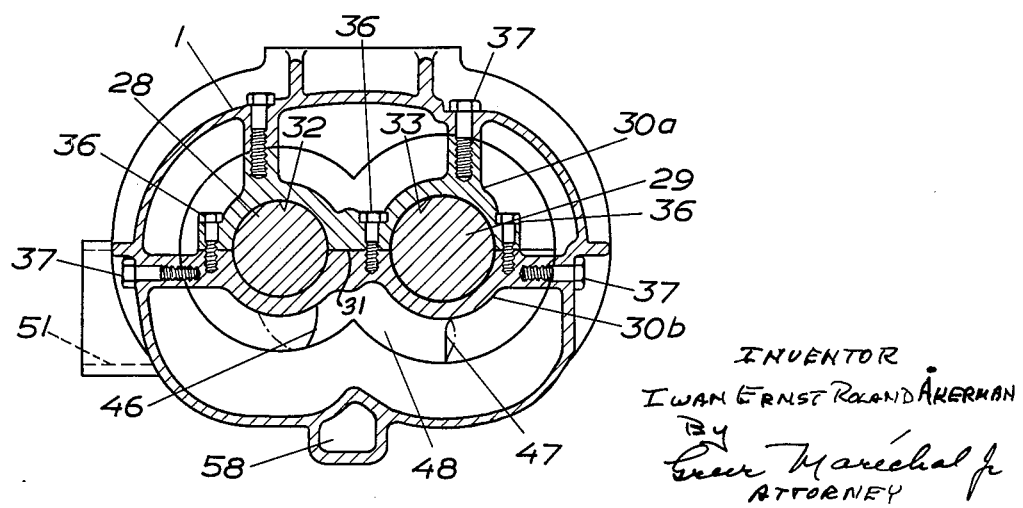
Figure 7:
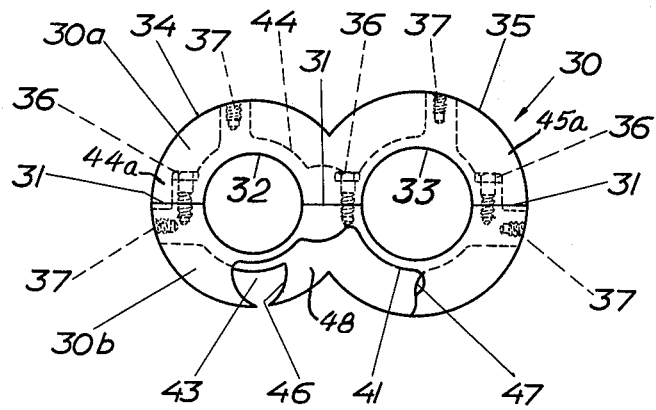
Figure 8:
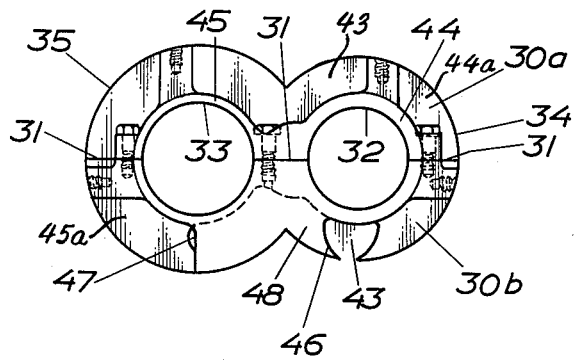
Figure 10:
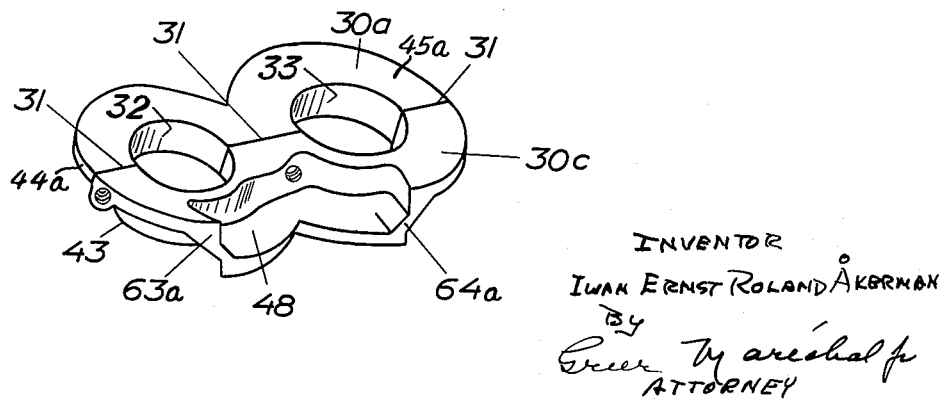

In the accompanying drawings FIG. 1 is a perspective view of a machine according to the invention looking towards the low pressure end of the machine. FIG. 2 is a horizontal section through the axis of the two rotors of the machine in FIG. 1. FIGS. 3 and 4 are transverse sections of the rotors of the low and high pressure stages, respectively, on lines III—III and IV—IV in FIG. 2. FIG. 5 is transverse section on line V—V in FIG. 2. FIG. 6 is a perspective view of the integral cylinder casing structure forming the intersecting bores for the rotors with the end covers and rotors taken away. FIGS. 7 and 8 are end views of the partition between the high pressure and low pressure portions of a machine according to the invention without intermediate cooling and looking from the low pressure end and from the high pressure end, respectively. FIG. 9 is a partial perspective view of the partition portion of the casing structure of a machine according to the invention with intermediate cooling, and FIG. 10 is a perspective view of the partition in FIG. 9 looking from below and from the low pressure end. FIG. 11 is a diagrammatic side view of a two stage compressor with intermediate cooling.

The machines illustrated in the accompanying drawings are two stage screw rotor compressors without and with intermediate cooling, respectively. However, it should be understood that the principles of the invention may be employed in machines in which a pressure fluid is expanded and which operate as motors, the illustrated embodiment being by no means limiting for the scope of the invention as set forth in the claims. The machine illustrated in FIGS. 1-8 is designed for operating without intermediate cooling, the heat produced by compression being carried away through radiation from the compressor housing and/or by means of cooling liquid, such as cooling and lubricating oil inserted in the air under compression.

The compressor according to FIGS. 1-8 consists of an integral cylinder casing 1 forming two pairs of intersecting bores 2, 3 and 4, 5, the bore 2 being provided for accommodating a male screw rotor portion 6 and the bore 3 a female screw rotor portion 7 of the low pressure stage of the compressor and the bore 4 a male high pressure rotor portion 8 and the bore 5 a female high pressure rotor portion 9.

The rotors 6, 8 and 7, 9 are carried out as integral bodies, respectively, and the helical lobes of the rotor portions 6 and 8 are of the same hand and lead and similarly the grooves of the female rotor portions 7 and 9 are also of the same hand and lead and formed to cooperate with the lobes of the rotor 6, 8. Each rotor is preferably cut in such a way that the lobes or grooves of the high pressure portion form a continuation of the lobes and grooves of the low pressure portions, respectively, as indicated by the chain-dotted lines 6a and 7a, respectively. This permits each two-stage rotor being finished with but a single setting of the cutting machine so that the portions of each lobe or groove on the low and high pressure sections are cut with the same milling tool setting. The rotors 6, 8 and 7, 9 are provided with trunnions 10, 11 at the high pressure end and trunnions 19 and 20 at the low pressure end which are rotatably mounted in cylindrical roller bearings 14. The bearings 12, 13 are fitted in counterbores 15 in the cylinder casing 1 and the roller bearings 14 in counterbores 16 in a split bearing carrier 17 fitted in the cylinder casing 1 by means of bolts 18. The axial ball bearings 13 take the thrust originating from air pressure on the high pressure end of the rotors, the thrust in opposite direction which may occur at the starting or stopping of the machine being taken up by the end surface 57 in the casing 1 or by a partition wall 30 fixed in the casing 1. The low pressure trunnions 19, 20 of the rotors rotatably mounted in the roller bearings 14 carry cylindrical helical gears 21 and 22 which operate as synchronizing gears and also to transmit power from a drive shaft 23 on one rotor to the other rotor. The drive shaft 23 is intended for connection to a diesel engine or other prime mover operating at substantially the conventional speed of industrial diesel engine. The drive shaft 23 may be replaced by a drive shaft 24 connected to the gear 21 and intended for operation by an electrical motor of higher speed than the diesel engine or by other high speed prime mover. The low pressure end of the casing 1 is closed by a cover 25 which may be mounted to fit around the drive shaft 23 with a sealing ring 26. The cover 25 may be rotated 180° when the drive shaft 23 is replaced by the drive shaft 24 so as to fit over the drive shaft 24 in the case when electrical or other high speed drive is desired. The cover 25 has a flange 27 for direct connection to an electric motor or to a clutch housing of a diesel engine as is conventional in the art.

The helical gears 21, 22 may be cut with the same hand and lead as the pertaining screw motors. Between the rotor portions 6 and 8 is provided a straight cylindrical sealing portion 28 and between the rotor portions 7 and 9 a straight cylindrical sealing portion 29 is provided. The sealing portions 28 and 29 form seals with a partition 30 which is divided on a diametrical plane 31 through the rotor axis in an upper portion 30a and a lower portion 30b as obvious from FIGS. 7 and 8. The partition 30 has two cylindrical sleeve-like sealing portions 44 and 45 provided with bores 32 and 33 which fit the cylindrical portions 28 and 29, respectively, of the rotors with a substantially airtight fit but with sufficient clearance to permit free rotation of the rotors in the bores 32, 33. The sleeve-like portions 44, 45 are connected with each other centrally and carry a first radial flange 44a, 45a at the low pressure stage end and a second radial flange 48 at the high pressure stage end of the partition wall, which flanges extend into sealing engagement with bores 2, 3. The external peripheral surfaces 34, 35 of the partition 30 are cylindrical surfaces which fit closely in the bores 2 and 3, respectively, so as to prevent leakage between the high pressure portion and the low pressure portion of the machine. The parts 30a and 30b of the partition 30 are fixed in correct position one relative to the other by three bolts 36 and the partition 30 is fixed in correct position in the bores 2, 3 by 4 bolts 37 secured and reamed in the casing 1 and providing a safe anchoring of the partition.

The casing 1 is provided with an air inlet opening 38 communicating with an air admission chamber 39 extending along the upper side of the rotors substantially to the chain-dotted line 40 in FIG. 2. The low pressure portion has an axial air outlet opening formed in the radial flanges 44a, 45a and confined by the curved line 41 and a radial air outlet opening in the casing 1 at the underside of the rotor extending to the dotted line 42 in FIG. 2. From the low pressure outlet confined by the lines 41, 42 a passage 43 extends around the central or sealing bosses 44, 45 of the partition 30 to an inlet opening confined by the border lines 46, 47 of a wall portion 48 of the partition 30 (along the cross-hatched area 43 in FIG. 8 on the high pressure side of the radial flanges 44a and 45a) and a line 49 formed by the upper portion of the casing 1 on top of the rotors and a high pressure inlet chamber 49a. The air compressed in the high pressure portion of the machine is discharged through a radial and axial opening partly confined by the line 50 at the underside of the rotor portions 8, 9 and communicating with a discharge passage 51 at the lower side of the high pressure end of the compressor.

52a is an oil pump, which is driven from the trunnion 11, and 52b is a fan drive for a not illustrated cooling fan driven by the trunnion 10. The screw rotors 6, 7 and 8, 9 may have profiles as indicated in FIGS. 3 and 4 and consequently, the bores 2 and 4 are continuous throughout the whole length of the cylinder casing whereas the bore 3 is coaxial but somewhat larger than the bore 5 in order to provide space for the addendum portion 53 of the rotor portion 7. It is obvious that in assembling the above described compressor the partition portions 30a and 30b are at first fitted on a set of rotor bodies 6, 8 and 7, 9 whereupon the assembly of the two rotor bodies and partition 30 is fitted axially into the casing 1 from the low pressure end of the casing. The partition is then fixed in position in the casing 1 by fitting the bolts 37. The cylindrical roller bearings and the bearing carrier 16 are then fitted on the trunnions 10, 11, 19, 20 of the rotors whereupon the thrust bearings 13 and the gears 21, 22 are fitted on the extreme ends of the trunnions 10, 11, 19, 20. The plane of division 54 of the bearing carrier 17 is a longitudinal axial plane 55 through the line of intersection 56 between the parallel bores 2, 3 of the cylinder casing 1. This division makes possible a certain adjustment of the clearance in the transmission 21, 22. When the gears 21, 22 have been fitted and adjusted into correct position the drive shaft 23 and the bell housing 25 are fitted and the parts 52a and b are fitted so that the compressor is ready for shipment.

It is obvious that the design is such that extremely little adjustment is necessary upon the assembly of the few parts of the compressor. In fact the only adjustment between the rotors may be carried out between the gears 21, 22. The axial clearance between the rotors and the plane 57 on the casing 1 may be set when fitting the bearings 13 and the axial clearance between the rotors and the low pressure side of the partition 30 may be set upon fitting of the partition and the bolts 37 in the casing 1. In view of the fact that each rotor is cut with the same hand and lead and with the lobes and grooves, respectively, of each rotor portion forming a continuous helix the rotors may be machined in one setting with one tool so that very close tolerances may be kept which ensure complete replaceability and also make possible matching of any two rotor bodies into a machine according to the invention. The partition 30 may preferably be carried out by a material with greater thermal expansion than the casing material and so dimensioned that when fitted in the cylinder casing the partition 30 will press against the walls of the cylinder casing upon attainment of operating temperature. The design is therefore such that integral rotor bodies may be used which ensures perfect tolerances and perfect fitting of the screw portions of the male and female high and low pressure rotor portions and which also ensures that such tolerances will not be worse after long time of operation or due to wear. Furthermore, leakage between the high pressure and low pressure portions of the machine are kept at extremely low values and very close tolerances may be kept between the cylinder bores and the rotors so that sealing fins at the tops of the lobes of the rotors may be dispensed with.

In order to cool the air under compression cooling liquid such as oil may be supplied under appropriate pressure to the conduit 58 communicating with a supply of cooling liquid (not shown). From conduit 58 a number of fine passages 59 lead into the compression chamber of the compressor where cooling liquid is injected in a finely divided state. The passages 59 may preferably open in the vicinity of the line of intersection 56 between the parallel bores at the underside of the cylinder casing. Passages may also lead cooling liquid to the bores 32, 33 and/or to the high pressure seal on the trunnions 10, 11 for sealing purpose.

The cooling liquid pump and means for separating cooling liquid from the compressed air delivered by the compressor are not illustrated or described hereinabove since they are conventional in connection with air compressors of the above described type and of the sliding vane type for some 25–30 years.

FIGS. 9–11 illustrate a modification of the compressor according to FIGS. 1–8 in which intremediate cooling of the air compressed by the compressor is provided. Equivalent parts in FIGS. 9–11 are designated by the same reference numerals as in FIGS. 1–8. For enabling intermediate cooling to be carried out the outlet opening from the low pressure stage of the compressor confined by the axial outlet 41 in the lower part 30c of the partition 30 and the line 42 on the cylinder casing 1a does not communicate with the high pressure admission chamber 49a but instead the radial flanges 44a, 45a form a portion 30c connected with flange 48 by wall portions 63a and 64a, FIG. 10, so that the space confined by wall portions 63a, 64a and flange 48 communicates with a passage 61 formed in a boss 62 at the lower side of the compressor. Wall portions 63 and 64, FIG. 10, in the part 30c of the partition 30 prevent air from flowing directly from the low pressure stage to the passage 43. A boss 63 at the top of the cylinder casing 1a, FIG. 9, forms a passage 64 leading to the passage 43 and the inlet opening and chamber 49a of the high pressure portion of the compressor. A conduit 65 connects the boss 62 to an air cooled or liquid cooled intermediate cooler 66 from which a conduit 67 leads to the boss 63. With the exception of the above described modifications illustrated in FIGS. 9–11 a compressor according to the invention for intermediate cooling may be carried out substantially as described in connection with FIGS. 1–8. When intermediate cooling is used, however, the introduction of cooling liquid in the air under compression mentioned in connection with FIGS. 1–8 may be dispensed with. When the intermediate cooler and/or the oil cooler is air cooled cooling air may be supplied by a fan driven by or mounted on the trunnion 10. Similarly, oil for cooling and sealing purposes may be supplied from an oil pump driven by the trunnion 11.

The screw rotor machines above described and illustrated in the drawings should only be considered as examples and may be modified in various different ways within the scope of the following claims. The partition 30 may, for instance, be split on two parallel diametrical planes perpendicular to the plane through the two rotor axes and the resulting three partition portions may be fixed together by four horizontal bolts instead of the three bolts 36.

What I claim is:

1. In a screw compressor apparatus of the character described having a low pressure stage and a high pressure stage, the combination which comprises a one-piece cylindrical casing having two overlapping parallel bores, an end cover for each end of said casing, a one-piece male rotor having a low pressure portion and a high pressure portion with a sealing portion therebetween, a one-piece female rotor having a low pressure portion and a high pressure portion with sealing portion therebetween, a partition wall separable from said casing for dividing said low pressure stage of said casing from said high pressure stage, said partition wall having the outer periphery thereof in sealing engagement with said bores in said low pressure stage of said casing, and being disposed on said sealing portions of said rotors for sealing fit thereon between said low pressure portion and said high pressure portion thereof before said rotors are inserted in said casing, and means for holding said partition wall against axial displacement after insertion thereof in said casing.

2. An apparatus as recited in claim 1 in which said partition wall is split into three portions along two vertical parallel planes through said casing perpendicular to a common horizontal plane through the axes of the rotors, and in which means are provided for holding the three split portions of the partition wall together.

3. In a screw compressor apparatus of the character described having a low pressure stage and a high pressure stage, the combination which comprises a one-piece cylindrical casing having two overlapping parallel bores, an end cover for each end of said casing, a one-piece male rotor having a low pressure portion and a high pressure portion with a sealing portion therebetween, a one-piece female rotor having a low pressure portion and a high pressure portion with sealing portion therebetween, a two-piece partition wall separable from said casing for dividing said low pressure stage of said casing from said high pressure stage, said partition wall being divided in a horizontal plane transverse to the axes of said rotors and being disposed on said sealing portions of said rotors for sealing fit thereon between said low pressure portion and said high pressure portion thereof before said rotors are inserted in said one-piece casing, said partition wall being in sealing engagement with said one-piece casing between said high pressure stage and low pressure stage thereof, and means for holding said partition wall against axial displacement in said casing after insertion therein.

4. In a screw compressor apparatus of the character described having a low pressure stage and a high pressure stage, the combination which comprises a one-piece cylindrical casing having two overlapping parallel bores, an end cover for each end of said casing, a one-piece male rotor having a low pressure portion and a high pressure portion with helical lobes and grooves on both portions and with a sealing portion therebetween, a one-piece female rotor having a low pressure portion and a high pressure portion with helical lobes and grooves on both portions and with a sealing portion therebetween said male and female rotors being disposed for intermeshing engagement in said bores of said casing, a two-piece partition wall for dividing said low pressure stage of said casing from said high pressure stage, said partition wall being separable from said casing and divided in a horizontal plane through the axes of said rotors and being disposed on said sealing portions of said rotors for sealing fit thereon between said low pressure portion and said high pressure portion thereof before said one-piece rotors are inserted into said one-piece casing, said partition wall being in sealing engagement with said one-piece casing between said high pressure stage and said low pressure stage thereof.

5. Apparatus as recited in claim 4 in which the diameter of the bores of the low pressure stage of the casing is substantially the same as the diameter of the partition wall portion of each rotor.

6. Apparatus as recited in claim 4 in which the material used for the partition wall has a greater coefficient of thermal expansion than the material used for the cylinder casing for effecting a tight-fitting pressure seal between said partition wall and said cylinder casing at an elevated operating temperature.

7. In a screw compressor apparatus of the character described, having a low pressure stage and a high pressure stage, the combination which comprises a one-piece cylindrical casing having two overlapping parallel bores, an end cover for each end of said casing, a one-piece male rotor having a low pressure portion and a high pressure portion with a cylindrical sealing portion therebetween, a one-piece female rotor having a low pressure portion and a high pressure portion with a cylindrical sealing portion therebetween, two sleeves disposed on said cylindrical sealing portions of said rotors, a transverse wall at the low pressure end of said sleeves extending therefrom to the periphery of said cylinder and having an axial opening therein adjacent said rotors, and a transverse wall separable from said casing and extending from said sleeves to the periphery of said cylinder at the end thereof opposite said low pressure side forming a substantially closed partition between said high pressure stage and said sealing portion axially of said axial opening, said sleeves and said transverse walls being in sealing engagement with said one-piece casing between said high pressure portion and said low pressure portion thereof.

8. In a screw compressor apparatus of the character described having a low pressure stage and a high pressure stage, the combination which comprises a one-piece cylindrical casing having two overlapping parallel bores, an end cover for each end of said casing, a one-piece male rotor having a low pressure portion and a high pressure portion with a cylindrical sealing portion therebetween, a one-piece female rotor having a low pressure portion and a high pressure portion with a cylindrical sealing portion therebetween, a two-piece partition wall being disposed on said sealing portions for dividing said low pressure stage and said high pressure stage of said casing and being separable from said casing, said partition wall having an axial opening communicating with said low pressure stage below and adjacent said rotors and said partition wall on the side adjacent said high pressure stage forming an axial and radial inlet to said high pressure stage and communicating with said axial opening at said low pressure stage while forming a closure axially thereto.

9. In a screw compressor apparatus of the character described having a low pressure stage and a high pressure stage, the combination which comprises a one-piece cylindrical casing having two overlapping parallel bores, an end cover for each end of said casing, a one-piece male rotor having a low pressure portion and a high pressure portion with a sealing portion therebetween, a one-piece female rotor having a low pressure portion and a high pressure portion with a sealing portion therebetween, a two-piece partition wall separable from said casing and dividing said low pressure stage of said casing from said high pressure stage and disposed on said sealing portions of said rotors, said partition wall having an axial opening communicating with the low pressure portion of said rotors and said cylindrical casing having a passage communicating with said axial opening in said partition, an intermediate cooler, a conduit leading from said passage to said intermediate cooler, a second passage in said casing leading to said high pressure stage thereof, and a second conduit leading from said intermediate cooler to said second passage.

10. Apparatus as recited in claim 1 in which said cylindrical casing has a counterbore surface at one end thereof and said rotors have shoulders adjacent said counterbore surface, said counterbore surface and said shoulders forming an axial thrust bearing in one direction, and in which axial anti-friction bearings are disposed in said casing at the end thereof opposite said counterbore surface and said shoulders and in which said rotors rotate, said anti-friction bearings taking axial thrust in the opposite direction.

References Cited by the Examiner

UNITED STATES PATENTS

| | | | |
|---|---|---|---|
| 2,578,196 | 12/51 | Montelius | 230—143 |
| 2,659,239 | 11/53 | Nilsson et al. | 230—143 |
| 2,706,452 | 4/55 | Hilton | 103—126 |
| 2,756,684 | 7/56 | Renzo | 103—126 |

FOREIGN PATENTS 903,500  2/54  Germany.

KARL J. ALBRECHT, *Primary Examiner.*

JOSEPH H. BRANSON, Jr., *Examiner.*